(12) United States Patent
Sadan et al.

(10) Patent No.: US 8,196,035 B2
(45) Date of Patent: Jun. 5, 2012

(54) ADAPTATION OF A WEBSITE TO MOBILE WEB BROWSER

(76) Inventors: Itai Sadan, Palo Alto, CA (US); Amir Glatt, San Francisco, CA (US)

( * ) Notice: Subject to any disclaimer, the term of this patent is extended or adjusted under 35 U.S.C. 154(b) by 519 days.

(21) Appl. No.: 12/352,132

(22) Filed: Jan. 12, 2009

(65) Prior Publication Data
US 2010/0070849 A1 Mar. 18, 2010

Related U.S. Application Data

(60) Provisional application No. 61/097,950, filed on Sep. 18, 2008.

(51) Int. Cl.
*G06F 3/14* (2006.01)
(52) U.S. Cl. ......... 715/234; 715/236; 715/238; 715/266
(58) Field of Classification Search .................. 715/234, 715/238
See application file for complete search history.

(56) References Cited

U.S. PATENT DOCUMENTS

| | | | |
|---|---|---|---|
| 6,601,057 B1 * | 7/2003 | Underwood et al. | 715/207 |
| 8,086,960 B1 * | 12/2011 | Gopalakrishna et al. | 715/266 |
| 2002/0143822 A1 * | 10/2002 | Brid et al. | 707/522 |
| 2006/0123042 A1 * | 6/2006 | Xie et al. | 707/102 |
| 2007/0162845 A1 * | 7/2007 | Cave et al. | 715/530 |
| 2008/0046803 A1 * | 2/2008 | Beauchamp et al. | 715/212 |
| 2008/0065974 A1 * | 3/2008 | Campbell | 715/200 |
| 2009/0044098 A1 * | 2/2009 | Wyler et al. | 715/234 |
| 2009/0077171 A1 * | 3/2009 | Kasha | 709/203 |
| 2009/0106706 A1 * | 4/2009 | Catherine | 715/854 |
| 2009/0265611 A1 * | 10/2009 | Sengamedu et al. | 715/234 |

OTHER PUBLICATIONS

"Optimizing a website for mobile devices", http://web.archive.org/web/20080117061737/http://modernnomads.info/wiki/index.php?page=Optimizing+a+website+for+mobile+devices.*

Yunpeng Xiao et al., A Dynamic Web Page Adaptation for Mobile Device Based on Web 2.0, Dec. 2008, ASEA 2008 "Advanced Software Engineering and its Applications", pp. 119-122.*

* cited by examiner

*Primary Examiner* — Stephen Hong
*Assistant Examiner* — Mario M Velez-Lopez
(74) *Attorney, Agent, or Firm* — Soroker Agmon (57) ABSTRACT

A method and a system of adaptation of a website to a mobile web browser. The method includes creating a snapshot version of a presentation layer of a website. The method also includes applying a design layer above the snapshot version and indicating an element of the snapshot version using the design layer. Furthermore, the method includes associating an identifying attribute of the element with a template used to create another website and creating a rule that associates a location of the identifying attribute in the snapshot version with another location in the template.

18 Claims, 10 Drawing Sheets

ADAPTATION OF A WEBSITE TO MOBILE WEB BROWSER

CLAIMS OF PRIORITY

This patent application is a utility application and claims priority from the provisional application No. 61/097,950 titled ADAPTATION OF A WEBSITE TO MOBILE WEB BROWSER filed on Sep. 18, 2008.

FIELD OF TECHNOLOGY

This disclosure relates generally to a capture method, a technical field of software and/or hardware technology and, in one example embodiment, to an adaptation of website to mobile device.

BACKGROUND

A user may use a mobile device (e.g. a pocket-sized computing device that may have a display screen) to browse a network of websites (e.g., the World Wide Web, a system of interlinked hypertext documents accessed via a computer network). A website may not be adapted to view on the mobile device (e.g. an image may not fit the size of the display screen, a data size of the website may require a certain period of time to download, a set of text of the website may become awkwardly formatted on the display screen, etc.). Additionally, the user may have difficulty inputting a set of information into the website (e.g. inputting text may be cumbersome with a touch screen, etc.). These factors may diminish a user's experience. The user may choose to not access the network of websites with the mobile device.

A website owner may create a separate website with a different set of content designed specifically for viewing on the mobile device. However, the separate website may need to be designed and maintained independently. The separate website may also require to be changed to maintain similar content to the website (e.g. the website designed for browsing by a personal computer) is changed. Thus, the separate website may require additional website designers and hardware to create and sustain. This may be costly to the website owner and increase the complexity of doing business.

SUMMARY

A method, system, and apparatus for adaptation of website to another type of website (e.g. mobile device, etc.) are disclosed. In one aspect, the method includes, applying a design layer above a presentation layer of a website, indicating an element of the snapshot version using the design layer, associating an identifying attribute of the element of the presentation layer with a template of another website, and creating a rule that associates a location of the identifying attribute in the snapshot version with another location in the template.

The method may include creating a snapshot version of the presentation layer, marking a snapshot version of the element with a comment and/or storing the snapshot version in a database. In addition, the method may include fetching a real-time version of the presentation layer of the website. The method may compare the real-time version of the presentation layer with the snapshot version of the presentation layer. The method may also include using the comment to algorithmically identify a section of the real-time version of the presentation layer that may correspond to the snapshot version of the element. The method may provide a specified set of data copied from the section to the template.

In addition, the method may include using the specified set of data in the template to display a modified version of the element on the other website in a form adapted to a specified type of internet browser. The method may also include executing an input of the other website on the real time version of the website. The modified version of the element on the other website may be in a form for display on a mobile device internet browser. The other website may be designed to be accessed by an internet browser of a mobile device. The identifying attribute may be associated with the template by moving a visual element of the design layer indicating the content of the presentation layer and placing the visual element in a visual representation of the template. The identifying attribute may include a position in a source code of the website, a text, a link, an image source, a font type, a data attribute, a search, a graphical user interface, a search field, a tab, or any other HTML element.

The method may include associating the element with a logical container of the template by moving the visual element of the design layer indicating the content of the presentation layer and placing the visual element in a visual representation of the logical container. The logical container may extract the identifying attribute from the element according to an extracting algorithm that may be characteristic of the logical container. The design layer may allow a mouse event and a document object model manipulation functionality to the presentation layer. An image logic container may extract an image source identifying attribute when an image element of the presentation layer is placed in the image logic container. A link logic container may extract a text attribute and/or a link source attribute when a link element of the presentation layer is placed in the link presentation layer. Other types of logic containers may be created and used to extract other types of HTML elements or other types of data associated with various visual elements of a website.

In another aspect, the system includes a design layer module to apply a design layer above a presentation layer of a website, an extraction module to indicate an element of the presentation layer and to associate an identifying attribute of the element of the presentation layer with a template of another website. The system also includes a rule module to use the identifying attribute to create a rule in the template to indicate the element in the presentation layer.

The system may include a snapshot module to create a snapshot version of the presentation layer and to mark a snapshot version of the element of the snapshot version with a comment, and a storage module to store the snapshot version in a database. The system may also include a real-time module to fetch a real-time version of the website, a smart-merge module to compare the real-time version of the presentation layer with the snapshot version of the presentation layer and to use the comment to algorithmically identify a section of the real-time version that corresponds to the snapshot version of the element. In addition, the system may include a data-supply module to supply a specified set of data copied from the section to the template.

The system may include a presentation module to use the specified set of data in the template to display a modified version of the element on the other website in a form for display on a specified type of internet browser. The system may also include a simulation module to execute an input of the other website on the real-time version of the website. The other website may be designed to be accessed by an internet browser of a mobile device. The modified version of the element on the other website may be in a form for display on a mobile device internet browser.

The system may also include a container module to move the element into a logic container of the template. The identifying attribute may be associated with the template by moving a visual element of the design layer indicating the content of the presentation layer and placing the visual element in a visual representation of the template. The identifying attribute may include a position in a source code of the website, a text, a link, an image source, a font type, a data attribute, a search, a graphical user interface, a search field, a tab, or any other HTML element. The logic container may extract the identifying attribute from the element according to an extracting algorithm that may be characteristic of the logic container.

An image logic container may extract an image source identifying attribute when an image element of the presentation layer is placed in the image logic container. A link logic container may extract a text attribute and a link source attribute when a link element of the presentation layer is placed in the link presentation layer. Other types of logic containers may be created and used to extract other types of HTML elements or other types of data associated with various visual elements of a website. An extracting module may associate another data from a specified database other than the presentation layer with the template of another website. The presentation module may use the other data in the template to display a modified version of the element on the other website in a form for display on a specified type of internet browser.

In yet another aspect, the method includes configuring a server to place a manipulation layer on top of a website that allows manipulation of the website, configuring the server to associate a content of the website with a logical container according to a specified type of manipulation of the website with the manipulation layer. The method also includes configuring the logical container to algorithmically extract a specified type of data from the content, and configuring the server to use the specified type of data to create a rule in a template of a simulated website designed for browsing by a mobile device extracted by the logical container and wherein the rule allows the server to associate the content with the template.

The method may include configuring the server to create a snapshot of the website. In addition, the method may configure the server to place a comment in a set of code of the snapshot that may correspond to the content of the website. The method may also include configuring the server to store the snapshot. The method may include configuring the server to fetch a fresh version of the website and identify a fresh content of the fresh version that may algorithmically correspond to the set of code of the snapshot. In addition, the method may include configuring the server to provide at least one of the fresh content and the set of code of the snapshot to the template. The method may also include configuring the server to use the template to create the simulated website designed for browsing by the mobile device.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, system, and apparatus to human powered medical device are disclosed. Although the present embodiments have been described with reference to specific example embodiments, it will be evident that various modifications and changes may be made to these embodiments without departing from the broader spirit and scope of the various embodiments.

In one embodiment, the method includes creating a snapshot version of a presentation layer (e.g., the presentation layer 204 of FIG. 2), applying a design layer (e.g., the design layer 208 of FIG. 2) above the snapshot version layer of a website (e.g., the website 104 of FIG. 1), using the design layer 208 to indicate an element (e.g. an image, a text, a link, etc.), a search of the presentation layer 204, associating an identifying attribute (e.g. may be a visual and/or software code characteristic, etc.) of the element of the snapshot version 206 with a template used to create another website (e.g., the other website 136 of FIG. 1), and using the identifying attribute to create a rule in the template that associates a location of the indicated attribute in the snapshot version with another location in the template. The rule may be stored in a data base and/or in the template and/or in any other location.

In another embodiment, the system includes a snapshot module (e.g., the snapshot module 122 of FIG. 1) to create a snapshot version of the presentation layer 204 and to mark a snapshot version of the element of the snapshot version with a comment. The system includes a design layer module (e.g., the design layer module 114 of FIG. 1) to apply a design layer (e.g., the design layer 208 of FIG. 2) above a presentation layer (e.g., the presentation layer 204 of FIG. 2) of a website (e.g., the website 104 of FIG. 1), an extraction module (e.g., the extraction module 116 of FIG. 1) to indicate an element of the presentation layer (e.g., the element of snapshot version 206 of FIG. 2) and to associate an identifying attribute of the element snapshot version 206 with a template of another website (e.g., the other website 136 of FIG. 1). The system also includes a rule module (e.g., the rule module 118 of FIG. 1) to use the identifying attribute to create a rule in the template that associates location of the indicated attribute in the snapshot version with another location in the template.

In yet another embodiment, the method includes configuring a server to place a manipulation layer on top of a website (e.g., the website 104 of FIG. 1) that allows manipulation of the website 104, configuring the server to create a snapshot of the website 104, configuring the server to associate a content of the website 104 with a logical container (e.g., the logical container 212 of FIG. 2) according to a specified type of manipulation of the website 104 with the manipulation layer. The method also includes configuring the server to place a comment in a set of code of the snapshot that corresponds to the content, configuring the server to store the snapshot, configuring the logical container 212 to algorithmically extract a specified type of data from the content, and configuring the server to use the specified type of data to create a rule in a template of a simulated website (e.g., the simulated website 436 of FIG. 4) designed for browsing by a mobile device (e.g., the mobile device 406 of FIG. 4) extracted by the logical container 212 (e.g., the rule may allow the server to associate the content with the template). The method may allow for manual modification of the specified set of data in the template. The manual modification of the specified set of data may include such operations as decreasing the font size of certain text on the mobile website, providing for a different background for the mobile website, realigning visual elements of the mobile website, etc.

Figure 1:
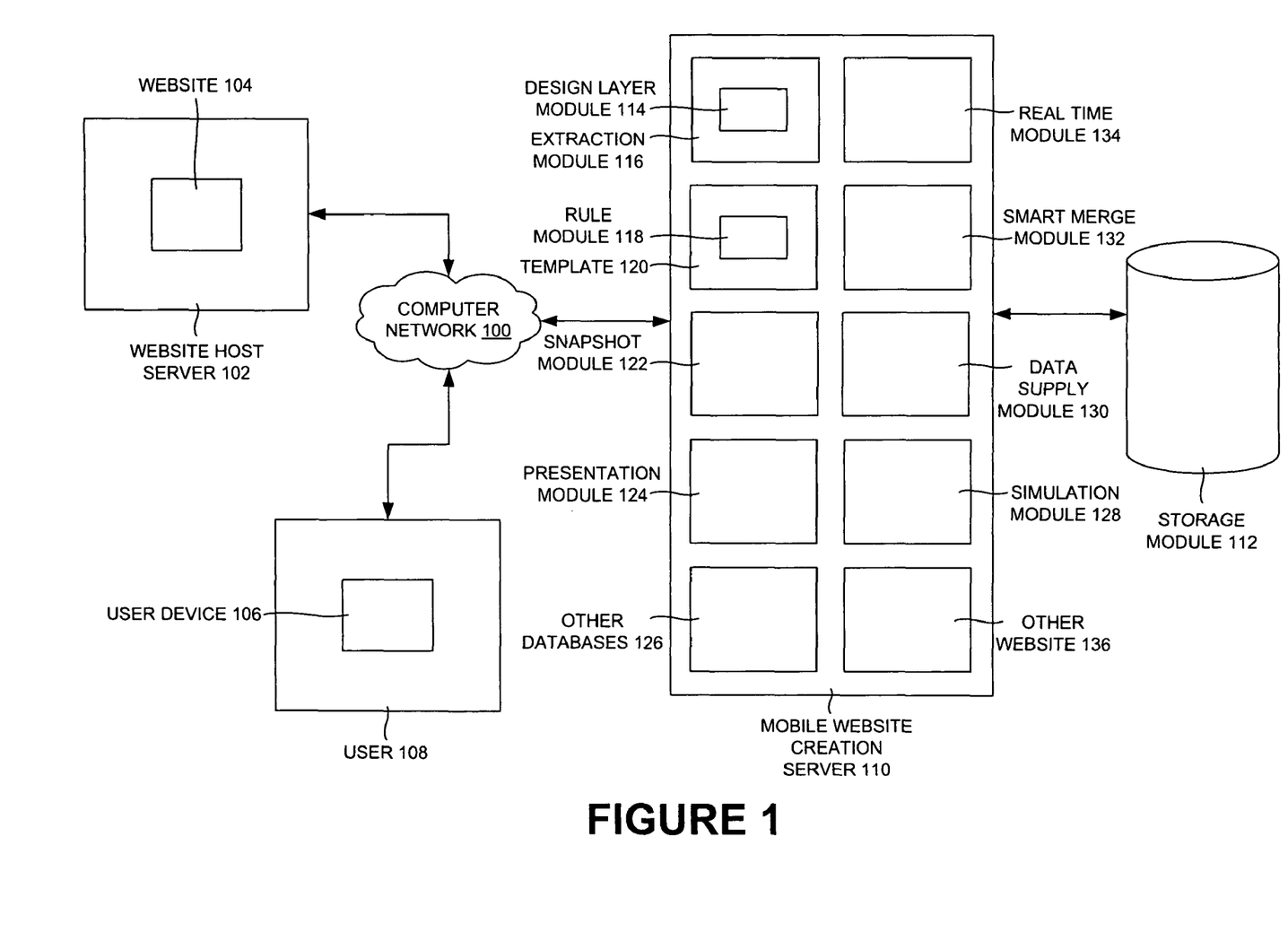
FIG. 1 is a system view of a user communicating with a website host server and a mobile website creation server through a computer network, according to one embodiment.

FIG. 1 is a systematic view of a user communicating with the website host server and a mobile website creation server using the network, according to one embodiment. Particularly, FIG. 1 illustrates a computer network 100, a website host server 102, a website 104, a user device 106, a user 108, a mobile website creation server 110, a storage module 112, a design layer module 114, an extraction module 116, a rule module 118, a template 120, a snapshot module 122, a presentation module 124, other data bases 126, a simulation module 128, a data supply module 130, a smart merge module 132, a real time module 134, and another website 136, according to one embodiment.

The computer network 100 may be a communication system that interconnects data processing systems (e.g., mobile devices, computers, etc.) in such a way so they can communicate information between themselves and with the outer world (e.g., through internet). The website host server 102 may be the data processing system (e.g., servers, computer, etc.) on which a website resides. The website 104 may be an entire collection of web pages and/or other information (e.g., images, sound, video files, etc.) designed for user interaction with a server. The user device 106 may be a data processing device (e.g., mobile device, computer, etc.) that may be used by the user for various purposes (e.g., communication, etc.).

The user 108 may be an individual (e.g., patron, consumer, etc.) who may use the user device 106 (e.g., mobile device, etc.) to communicate with the server for certain services (e.g., may be internet based services). The mobile website creation server 110 may be a data processing system (e.g., server, a computer, etc.) that may simulate the websites into mobile compatible user interfaces (e.g., this may be website). The storage module 112 may be a database that may store the data (e.g., some specified data) of the mobile website creation server 110. The design layer module 114 may apply a design layer (e.g., the layer that may organize the user interface) above a presentation layer (e.g., the presentation layer 204 of FIG. 2) of the website 104.

The extraction module 116 may extract the data from the template of the websites (e.g., an element of the presentation layer 204) into the template module 120. The extraction module 116 may also associate an identifying attribute of the element of the presentation layer 204 with a template of another website. The rule module 118 may use the identifying attribute to create a rule in template (e.g., the template 120) to indicate the element in the presentation layer 204. The template 120 may be a set of pre-designed formats for text, graphics, etc. on which new pages and/or webs can be based.

The snapshot module 122 may create a snapshot version of the presentation layer 228 and to mark a snapshot version of the element of the snapshot version with a comment. A snapshot version of the presentation layer may be an instance of a website saved at a certain point of time.

The presentation module 124 may use the specified set of data in the template to display a modified version (e.g., mobile compatible version) of the element on the other website in a form for display on a specified type of internet browser (e.g., internet browsers in mobile devices). The other data bases 126 may store information (e.g., text, links, images, video, audio, etc.) associated with the mobile website creation server 110. The simulation module 128 may execute an input of the other website on the real-time version of the website.

The data-supply module 130 may supply a specified set of data copied from the section (e.g., from the website) to the template (e.g., mobile compatible). The smart merge module 132 may compare the real-time version of the presentation layer 226 with the snapshot version of the presentation layer 228. The smart merge module 132 may also use the comment to algorithmically identify a section of the real-time version that corresponds to the snapshot version of the element. The real time module 134 may fetch a real-time version of the website 104. The other website 136 may be the real-time version of the website that may be used by the mobile website creation server 110 as a form for display on a specified type of internet browser (e.g., browsers in internet).

In an example embodiment, the website 104 may be hosted by the website host server 102. The user 108 may use the user device 106 (e.g., mobile device) to communicate with the website host server 102 for some specified services (e.g., internet based services) through the computer network 100 (e.g., internet, etc.). The mobile website creation server 110 may include the design layer module 114, the template 120, the snapshot module 122, the presentation module 124, the other databases 126, the simulation module 128, the smart merge module 132, the real time module 134, and the other website 136. The design layer module 114 may include the extraction module 116. The template 120 may include the rule module 118. The storage module 112 may communicate with the mobile website creation server 110 to store the related information (e.g., snapshots, etc.).

A snapshot version of the element may be marked (e.g., using the snapshot module 122 of FIG. 1) with a comment. The snapshot version may be stored (e.g., using the storage module 112 of FIG. 1) in a database. The real-time version may be fetched (e.g., using the of the real time module 134) of the website 104. An input of the other website 136 may be executed (e.g., using the simulation module 128) on the real-time version of the website 104. The identifying attribute may be associated with the template 120 by moving a visual element of the design layer (e.g., logo, image tab, text, etc.) indicating the content of the presentation layer 204 and placing the visual element in a visual representation of the template 120. The identifying attribute may include a position in a source code of the website 104, a text, a link, an image source, a font type, a data attribute, a search, a graphical user interface, a search field, a tab, or any other HTML element.

The design layer module 114 may be applied to a design layer (e.g., the design layer 208 of FIG. 2) above the presentation layer 204 of the website 104. The extraction module 116 may indicate an element of the presentation layer 204 and to associate an identifying attribute of the element of snapshot version 206 with the template 120 of the other website 136. The rule module 118 may use the identifying attribute to create a rule in the template 120 to indicate the element in the presentation layer 204 (e.g., the element of snapshot version 206).

The snapshot module 122 may create a snapshot version of the presentation layer 204 and to mark a snapshot version of the element of the snapshot version with a comment. The storage module 112 may store the snapshot version in a database. The real-time module 134 may fetch a real-time version of the website 104. The smart-merge module 132 may compare the real-time version of the presentation layer 226 with the snapshot version of the presentation layer 228 and to use the comment to algorithmically identify a least one section of the real-time version that may correspond to the snapshot version of the element. The data supply module 130 may supply a specified set of data copied from the section to the template 120.

The presentation module 124 may use the specified set of data in the template 120 to display a modified version of the element on the other website 136 in a form for display on a specified type of internet browser. The simulation module 128 may execute an input of the other website 136 on the real-time version of the website 104. The other website 136 may be designed to be accessed by an internet browser of a mobile device. The modified version of the element on the other website 136 may be in a form for display on a mobile device internet browser.

Figure 2:
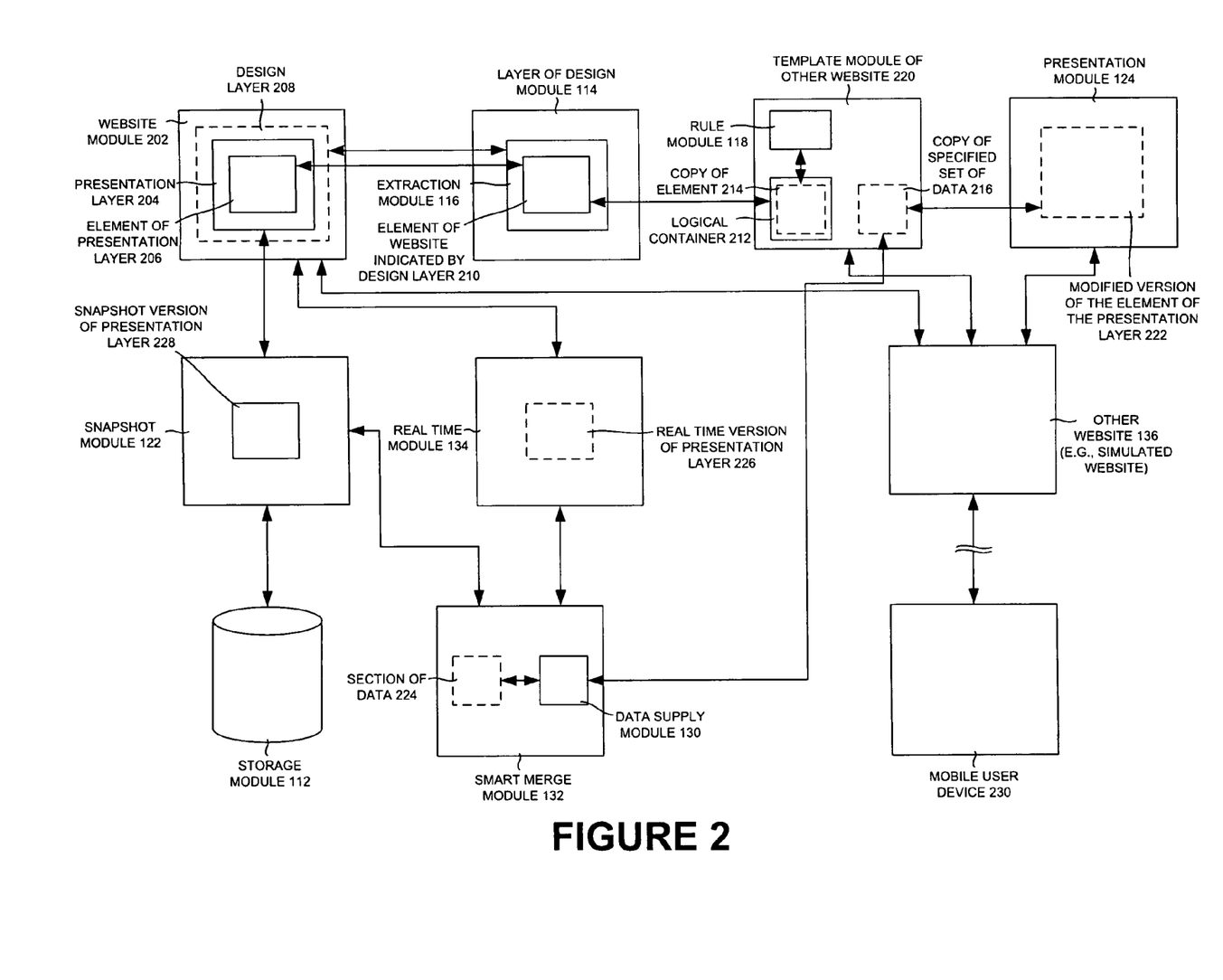
FIG. 2 is a system view illustrating communication between various modules for generating a website (e.g., simulated website) on a mobile device, according to one embodiment.

The container module may move the element into a logic container of the template 120. The identifying attribute may be associated with the template 120 by moving a visual element (e.g., logo, image, tab, etc.) of the design layer 208 indicating the content of the presentation layer 204 and placing the visual element in a visual representation of the template 120. The identifying attribute may include a position in a source code of the website 104, a text, a link, an image source, a font type, a data attribute, a search, a graphical user interface, a search field, a tab, or any other HTML element.

A server (e.g., mobile website creation server 110, etc.) may be configured to place a manipulation layer on top of the website 104 that may allow manipulation of the website 104. The server may be configured (e.g., using the logical container module) to associate a content of the website 104 with the logical container 212 according to a specified type of manipulation of the website 104 with the manipulation layer.

FIG. 2 is a systematic view of interaction of elements of different websites for adaption of website on a mobile device, according to one embodiment. Particularly, FIG. 2 illustrates a website module 202, a presentation layer 204, an element of snapshot version 206, a design layer 208, an element of website indicated by design layer 210, a logical container 212, a copy of element 214, a copy of specified set of data 216, a template module of other website 220, a modified version of the element of presentation layer 222, a section of data 224, a real time version of presentation layer 226, a snapshot version of presentation layer 228, and a mobile user device 230, according to one embodiment.

The website module 202 may be software/hardware that manage (e.g., providing response to requests, communication with client/server devices, etc.) the website. The presentation layer 204 may be layer on the website 104 on which the web pages of the website may be presented. The element of snapshot version 206 may include elements like template of the other website, logo, image, text, etc. The design layer 208, which may be above the presentation layer 204, may allow manipulation functionality to the presentation layer 204. The element of website indicated by design layer 210 may be an element on the website 104 may be extracted by the extraction module 116 from the design layer 208.

Figure 3:
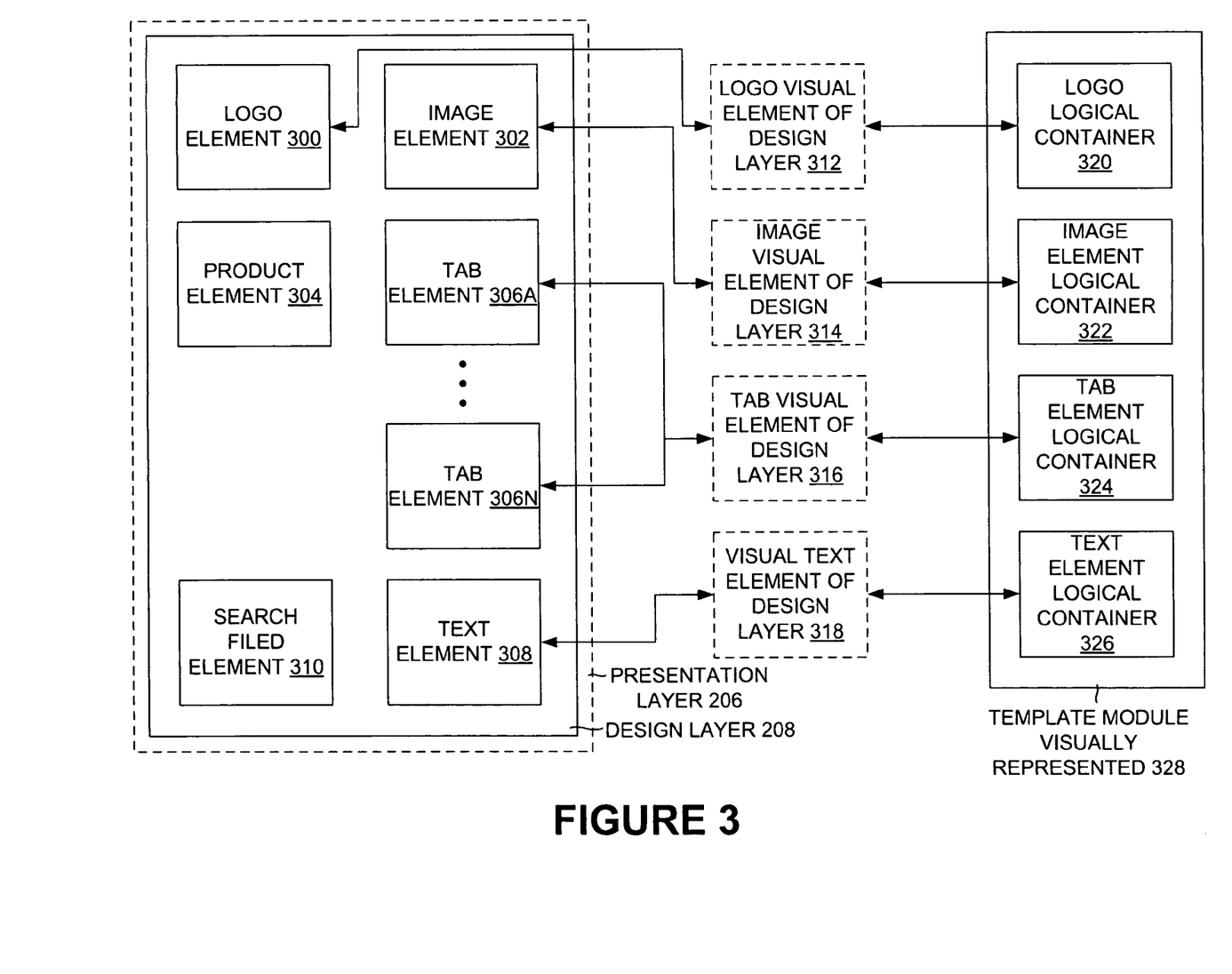
FIG. 3 is a systematic view illustrating the identification and extraction of different attributes associated with the template of a website, according to one embodiment.

The logical container 212 (e.g., may include a logo logical container 320, an image element logical container 322, a tab element logical container 324, a text element logical container 326, etc.) may process (e.g., extract, store, etc.) the element of an identifying attribute from according to an extracting algorithm that is characteristic of the logical container. The copy of element 214 may be an element copied from the website which may be indicated by the design layer extraction 208. The copy of the specified set of data 216 may be the specified set of data that may be accessed from the data supply module 130 of the smart merge module 132 that may include the snapshot version of the elements of the presentation layer 204 of the website 120.

The modified version of the element of the presentation layer 222 may be an element of the snapshot version of the presentation layer 228 that is modified to be suitable to view on the other website 136. The section of data 224 may be a portion of data (e.g., commented snapshot version of the presentation layer etc.) that may be stored in the data base and may be accessed by the data supply module 130. The real time version of presentation layer 226 may be version of the presentation layer of the website 104 at the particular time (e.g., present time, real time, etc.). The snapshot version of presentation layer 228 may be a copy of the presentation layer at the particular time that may be created using the snapshot module 122. The mobile user device 230 may be a communication device that may be used to communicate with the other users through the communication network.

In an example embodiment, the website module 202 may communicate with the design layer module 114, the snapshot module 122, the real time version of presentation layer 226, and/or other website 136. The design layer module 114 may communicate with template module of other website 220. The template module of other website 220 may communicate with the presentation module 124, the other website 136, and the smart merge module 132. The presentation module 124 may communicate with the other website 136. The other website 136 may communicate with the mobile user device 230. The snapshot module 122 may communicate with the storage module 112, the smart merge module 132, and/or the website module 202. The real time module 134 may communicate with the website module 202 and/or the smart merge module 132. The smart merge module 132 may communicate with the snapshot module 122, the real time module 134, and/or the rule module 118.

The website module 202 may include the design layer 208, the presentation layer 204. The presentation layer 204 may communicate with the extraction module 116 and the snapshot module 122. The element of snapshot version 206 may communicate with the element of website indicated by design layer 210. The design layer 114 may include the extraction module 116 and/or the element of website indicated by design layer 210. The element of website indicated by design layer 210 that may communicate with the copy of element 214 of the template module of other website 220. The template module of other website 220 may include the rule module 118, the copy of element 214, the rule module 118, and/or the copy of specified set of data 216. The copy of specified set of data 216 (e.g., may include logical container 212) may communicate with the rule module 118 and the copy of specified set of data 216. The presentation module 124 may include the modified version of the element of the presentation layer 222. The copy of specified set of data 216 may communicate with the modified version of the element of the presentation layer 222. The snapshot module 122 may include the snapshot version of the presentation layer 228. The real time module 134 may include the real time version of presentation layer 226. The smart merge module 132 may include the section of data 224 and the data supply module. The section of data 224 and the data supply module may communicate with each other.

The snapshot version of the presentation layer 228 may be created (e.g., using the snapshot module 122 of FIG. 1). The real-time version of the presentation layer 226 may be compared with the snapshot version of the presentation layer 228. The comment may be used (e.g., using the smart-merge module 132) algorithmically that may identify a section of the real-time version of the presentation layer 226 that may correspond to the snapshot version of the element. The specified set of data may be copied (e.g., copy of specified set of data 216) from the section provided to the template 120.

The specified set of data may be used (e.g., using the presentation module 124) in the template 120 to display a modified version of the element of presentation layer 222 on the other website 136 in a form adapted to a specified type of internet browser. The element may be associated (e.g., using the container module) with the logical container 212 of the template 120 by moving the visual element of the design layer 208 indicating the content of the presentation layer 204 and placing the visual element in a visual representation of the logical container 212.

The logical container 212 may extract (e.g., using the extracting module 116) the identifying attribute from the element according to an extracting algorithm that may be characteristic of the logical container 212. The design layer 208 may allow one of a mouse event and document object model manipulation functionality to the presentation layer 204. The logical container 212 may be configured (e.g., using the smart-merge module 132 of FIG. 1) that may algorithmically extract (e.g., using the extraction module 116) a specified type of data from the content. The logical container 212 may be configured (e.g., using the smart-merge module 132 of FIG. 1) that may algorithmically extract (e.g., using the extraction module 116) a specified type of data from the content. FIG. 3 is a systematic view illustrating the identification of different attributes associated with the template of the website, according to one embodiment. Particularly, FIG. 3 illustrates a logo element 300, an image element 302, a product element 304, a tab element 306A-N, a text element 308, a search field element 310, a logo visual element of design layer 312, an image visual element of design layer 314, tab visual element of design layer 316, a visual text element of design layer 318, a logo logical container 320, an image element logical container 322, a tab element logical container 324, and a text element logical container 326, according to one embodiment.

The logo element 300 may be a recognizable element that may represent an organization or a product. The image element 302 may be a visual representation (e.g., of an object, scene, person, abstraction, etc.) in the user interface view (e.g., website). The product element 304 may be a visual representation (e.g., picture, etc.) created by an individual or a process. The tab element 306A-N may be an element of the user interface view (e.g., website 104) that may have certain functions. The text element 308 may be the body matter of the website 104 that may illustrate (e.g., explain, guide, etc.) the content in the user interface. The search field element 310 (e.g., text box with options for search) may enable the user 108 to search for details through the user interface. The logo visual element of design layer 312 may be the extracted logo content from the logo element 300 that may be required for the user device 106.

The image visual element of design layer 314 may be the extracted image content from the image element 302 that may be required for the user device 106. The tab visual element of design layer 316 may be the extracted tab visual content from the tab element 306 that may be required for the user device 106. The text visual element of design layer 318 may be the extracted text visual content from the text element 308 that may be required for the user device 106. The logo logical container 320 may be a logical storage that may process (e.g., store, etc.) the data from the logo visual element of design layer 312. The image element logical container 322 may be a logical storage that may process (e.g., store, etc.) the data from the image visual element of design layer 314. The tab element logical container 324 may be a logical storage that may process (e.g., store, etc.) the data from the tab visual element of design layer 316.

The text element logical container 326 may be a logical storage that may process (e.g., store, etc.) the data from the visual text element of design layer 318. The template module visually represented 328 may be the collection of the logical containers that may be include various objects (e.g., image, tabs, visual text, etc.) that may be required by the rule module to design the user interface (e.g., for website in the internet browser) of the mobile device.

In an example embodiment, the design layer 208 may include the presentation layer 204 and/or the snapshot version 206. The presentation layer 204 may include the logo element 300, the image element 302, the product element 304, the tab element 306A-N, the text element 308, and the search field element 310. The template module visually represented 328 may include logo logical container 320, the image element logical container 322, the tab element logical container 324, and/or the text element logical container 326. The template module visually represented 328 may include the extracted data from various elements of the presentation layer 204 (e.g., the logo element 300, the image element 302, etc.).

The logic container (e.g., the logical container 212) may extract the identifying attribute (e.g., using the extraction module 116) from the element according to an extracting algorithm that is characteristic of the logic container 212. In one example, a specified-type of logic container (e.g., the logical container 212) may extract a specified-type of identifying attribute of a specified-type of HTML element when a representation of the specified-type of html element of the snapshot version is placed (e.g. a drag and drop operation) in the specified-type of logic container. The specified-type of HTML element may be associated with a particular HTML element that indicates structure in an HTML document (e.g. a link, a text, a form, an image, etc.). In yet another example, the specified-type of logic container (e.g., the logical container 212) may be the image logic container 322. The image logic container 322 may extract an image source identifying an attribute when the image element 302 of the presentation layer 204 is placed in the image logic container 322. Likewise, in another example, a link logic container may extract a text attribute and/or a link source attribute when a link element of the snapshot version is placed in the link presentation layer.

The extracting module (e.g., the extraction module 116) may associate another data from a specified database (e.g. data coming from files, web services, user input text, etc.) other than the presentation layer with the template of the other website 136. The presentation module 124 may use the other data in the template to display a modified version of the element on the other website 136 in a form for display on a specified type of internet browser.

Figure 4:
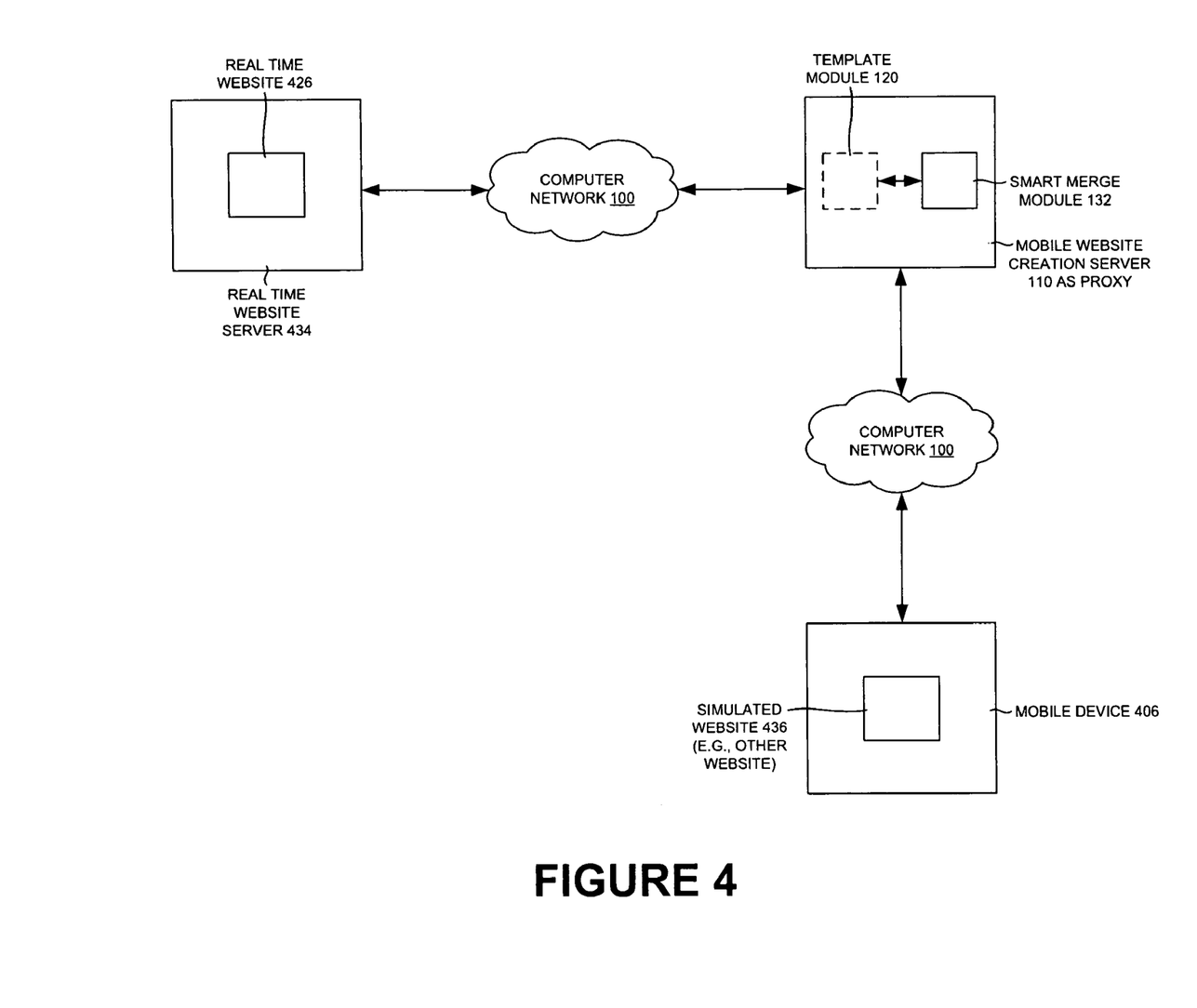
FIG. 4 is a system view illustrating the communication between a real time website server, a mobile website creation sever and the mobile device through the computer network, according to one embodiment.

FIG. 4 is a systematic view illustrating the communication between real time website server, mobile website creation sever and a mobile device through a network, according to one embodiment. Particularly, FIG. 4 illustrates a mobile device 406, a real time website 436, and a real time website server 434, according to one embodiment.

The mobile device 406 (e.g., converged device, handheld device, handheld computer, etc.) may be a data processing device that may be used by the user 108 for communication with the other users. The real time website 436 may be a collection of web pages, associated code and/or interlinked documents on a web server. The real time website server 434 may be a data processing system that manages and/or shares web based applications accessible anytime from any computer connected to the internet.

In example embodiment, the real time website may be managed (e.g., sending responses to the requests, etc.) by the real time website server 434. The mobile device 406 may receive the simulated website from the mobile website creation server 110 through the computer network 100. The mobile website creation server 110 may act as a proxy server by processing the website in a remote location. The mobile website creation server 110 may use the template 120, smart merge module 132, etc. to simulate the website in the mobile device 406.

The modified version of the element on the other website 136 may be in a form for display on the mobile device 406 internet browser. The server may be configured to use the specified type of data to create a rule in the template 120 of the simulated website 436 designed for browsing by the mobile device 406 extracted by the logical container 212 and the rule may allow the server to associate the content with the template 120. The server (e.g., the mobile website creation server 110) may be configured (e.g., using the snapshot module 122 of FIG. 1) to create a snapshot of the website 104.

The server may be configured (e.g., using the snapshot module 122 of FIG. 1) to place a comment in a set of code of the snapshot that may correspond to the content of the website 104. The server may be configured (e.g., using the storage module 112 of FIG. 1) which may store the snapshot. The server (e.g., the mobile website creation server 110) may be configured (e.g., using the snapshot module 122 of FIG. 1) to create a snapshot of the website 104. The server may be configured (e.g., using the snapshot module 122 of FIG. 1) to place a comment in a set of code of the snapshot that may correspond to the content of the website 104. The server may be configured (e.g., using the storage module 112 of FIG. 1) which may store the snapshot.

The server may be configured (e.g., using the real-time module 134 of FIG. 1) to fetch a fresh version of the website 104 and identify a fresh content of the fresh version that algorithmically may correspond to the set of code of the snapshot. The server may be configured (e.g., using the real-time module 134) to provide the fresh content and the set of code of the snapshot to the template 120. The server may be configured (e.g., using the simulation module 128) to use the template 120 to create the simulated website 436 designed for browsing by the mobile device 406.

The server may be configured to place a manipulation layer on top of the website 104 that may allow manipulation of the website 104. The server may be configured (e.g., using the logical container module) to associate a content of the website 104 with the logical container 212 according to a specified type of manipulation of the website 104 with the manipulation layer.

The server may be configured to use the specified type of data to create a rule in the template 120 of the simulated website 436 designed for browsing by the mobile device 406 extracted by the logical container 212 and the rule may allow the server to associate the content with the template 120. The server may be configured (e.g., using the snapshot module 122 of FIG. 1) to create a snapshot of the website 104. The server may be configured (e.g., using the snapshot module 122 of FIG. 1) to place a comment in a set of code of the snapshot that may correspond to the content of the website 104. The server may be configured (e.g., using the storage module 112 of FIG. 1) which may store the snapshot.

The server may be configured (e.g., using the real-time module 134 of FIG. 1) to fetch a fresh version of the website 104 and identify a fresh content of the fresh version that may algorithmically correspond to the set of code of the snapshot. The server may be configured (e.g., using the real-time module 134) to provide of the fresh content and the set of code of the snapshot to the template 120. The server may be configured (e.g., using the simulation module 128) to use the template 120 to create the simulated website 436 (e.g., the other website 136) designed for browsing by the mobile device 406.

Figure 5:
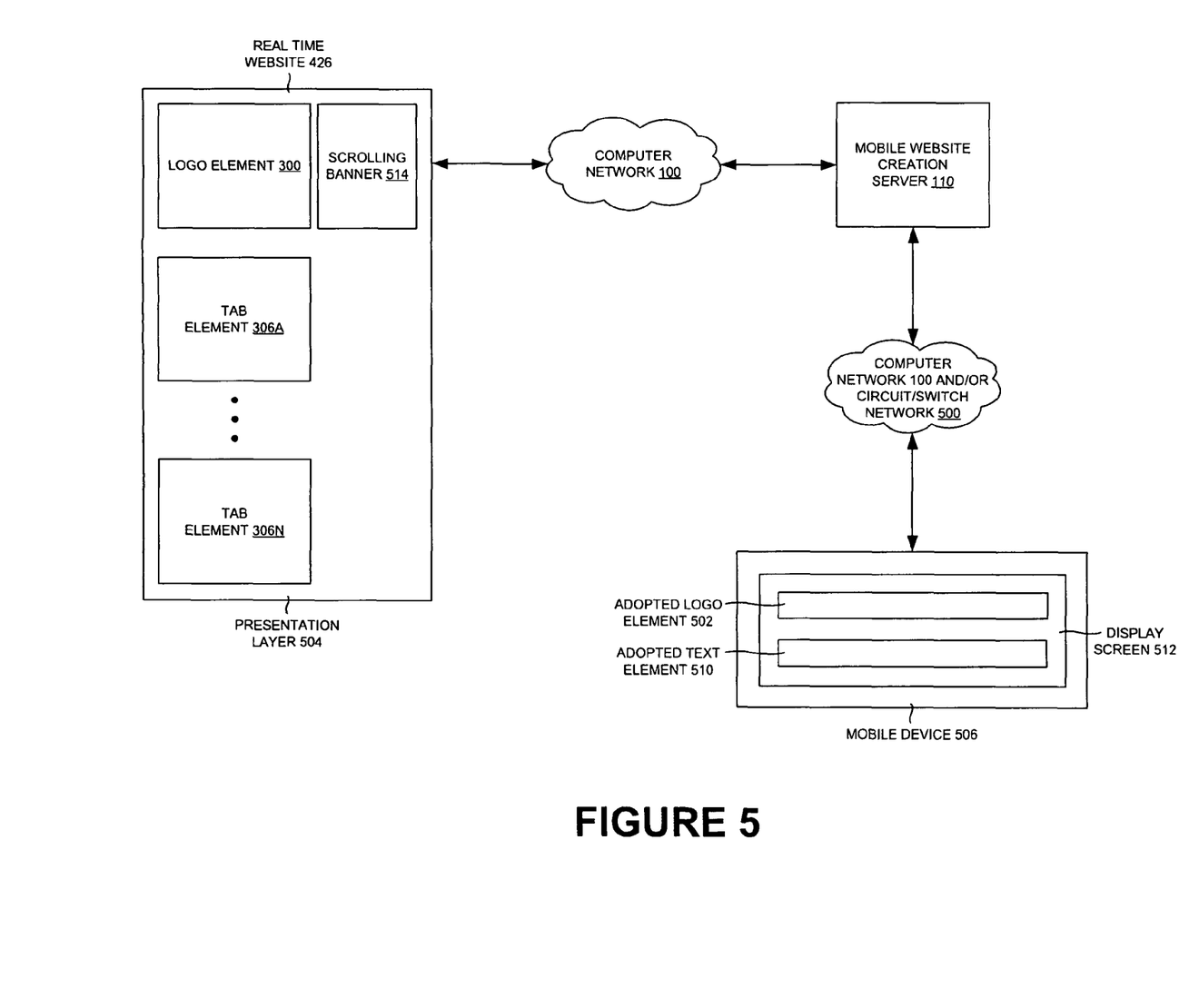
FIG. 5 is a system view illustrating the simulation of the website in a mobile device through the mobile website creation server, according to one embodiment.

FIG. 5 is a system view illustrating the simulation of the website in a mobile device through the mobile website creation server 110, according to one embodiment. Particularly, FIG. 5 illustrates the computer network 100, the mobile website creation server 110, the logo element 300, a circuit/switch network 500, an adapted logo element 502, a scrolling banner 504, a mobile device 506, a text element 508A-N, an adapted text element 510 and a display screen 512, according to one embodiment.

The circuit/switch network 500 may be a networking device that may enable communication between networks to transfer data from source to destination through a nodes. The adapted logo element 502 may be extracted version of the logo element 300 that may be displayed in the mobile device internet browser. The scrolling banner 504 may be a customized display in the user interface system (e.g., website). The mobile device 506 (e.g., converged device, handheld device, handheld computer, etc.) may be a data processing device that may be used by the user 108 for communication with the other users. The text element 508A-N may be the body matter of the website 104 that may illustrate (e.g., explain, guide, etc.) the content in the user interface. The adapted text element 510 may be the simulated version of the text element of the text element 508A-B. The display screen 512 may be the input/output interface of the mobile device 506 that may enable communication (e.g., illustration through user interface, touch screen, etc.) with the device.

In example embodiment, FIG. 5 illustrates simulation of the presentation layer 504 in the mobile device 506 display screen 512. The logo element 300, the text element 508A-N, the scrolling banner 514, etc. of the presentation layer 504 may be simulated and illustrated into the display screen 512 of the mobile device 506. The mobile website creation server 110 may extract the elements of the presentation layer 504 through the computer network 100. The mobile website creation server creates the mobile compatible version of the presentation layer 504 for the mobile browsing system. The mobile website creation server 110 may act as a proxy to the mobile device in order to create a user interface (e.g., webpage) for the mobile device browser.

Figure 6:
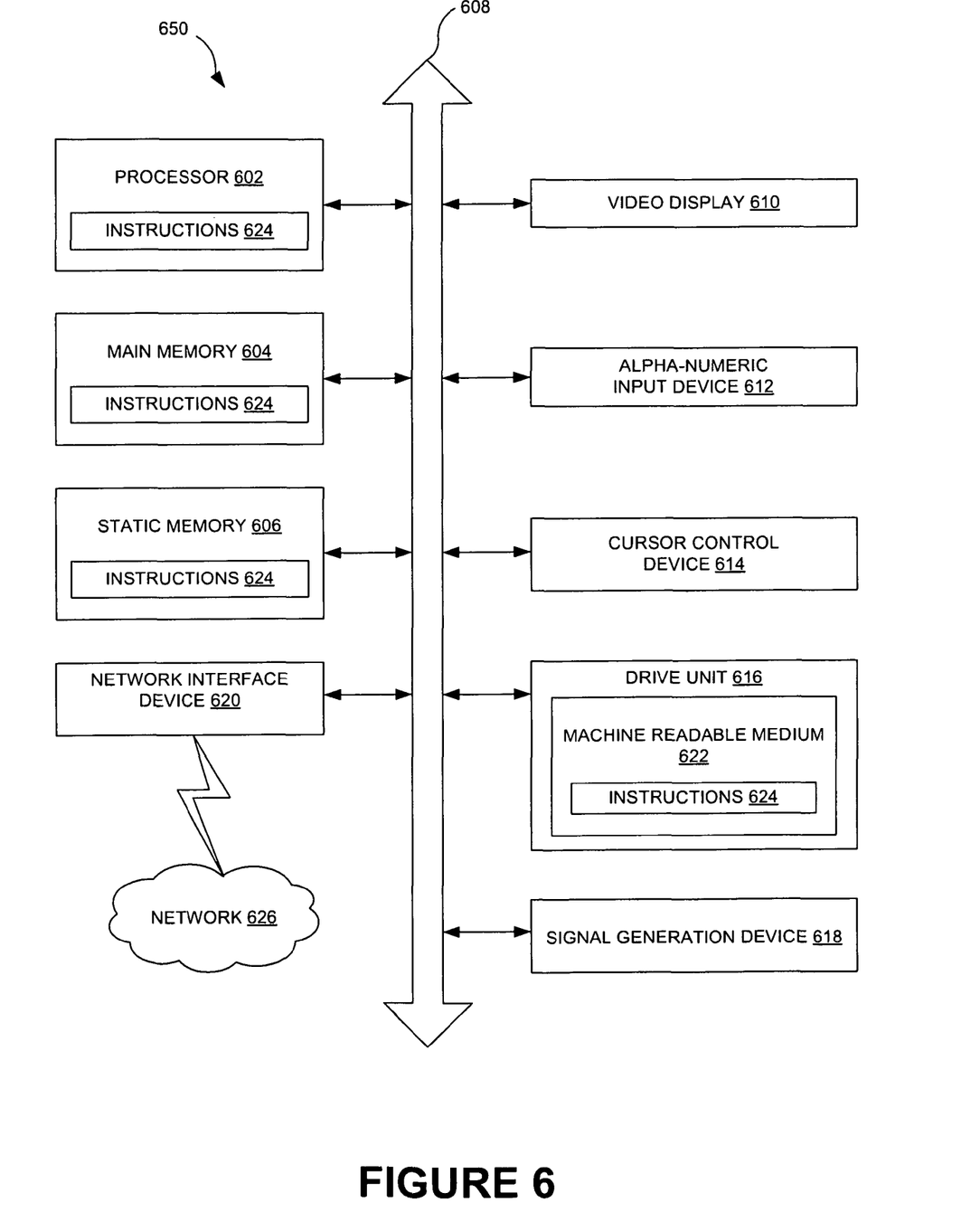
FIG. 6 is a diagrammatic system view of a data processing system in which any of the embodiments disclosed herein may be performed, according to one embodiment.

FIG. 6 is a diagrammatic system view of a data processing system in which any of the embodiments disclosed herein may be performed, according to one embodiment. Particularly, the diagrammatic system view 600 of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a machine readable medium 622, instructions 624, and a network 626, according to one embodiment.

The diagrammatic system view 600 may indicate a personal computer and/or the data processing system in which one or more operations disclosed herein are performed. The processor 602 may be a microprocessor, a state machine, an application specific integrated circuit, a field programmable gate array, etc. (e.g., Intel® Pentium® processor). The main memory 604 may be a dynamic random access memory and/or a primary memory of a computer system.

The static memory 606 may be a hard drive, a flash drive, and/or other memory information associated with the data processing system. The bus 608 may be an interconnection between various circuits and/or structures of the data processing system. The video display 610 may provide graphical representation of information on the data processing system. The alpha-numeric input device 612 may be a keypad, a keyboard and/or any other input device of text (e.g., a special device to aid the physically handicapped).

The cursor control device 614 may be a pointing device such as a mouse. The drive unit 616 may be the hard drive, a storage system, and/or other longer term storage subsystem. The signal generation device 618 may be a bios and/or a functional operating system 106 of the data processing system. The network interface device 620 may be a device that performs interface functions such as code conversion, protocol conversion and/or buffering required for communication to and from the network 626. The machine readable medium 622 may provide instructions on which any of the methods disclosed herein may be performed. The instructions 624 may provide source code and/or data code to the processor 602 to enable any one or more operations disclosed herein.

Figure 7A:
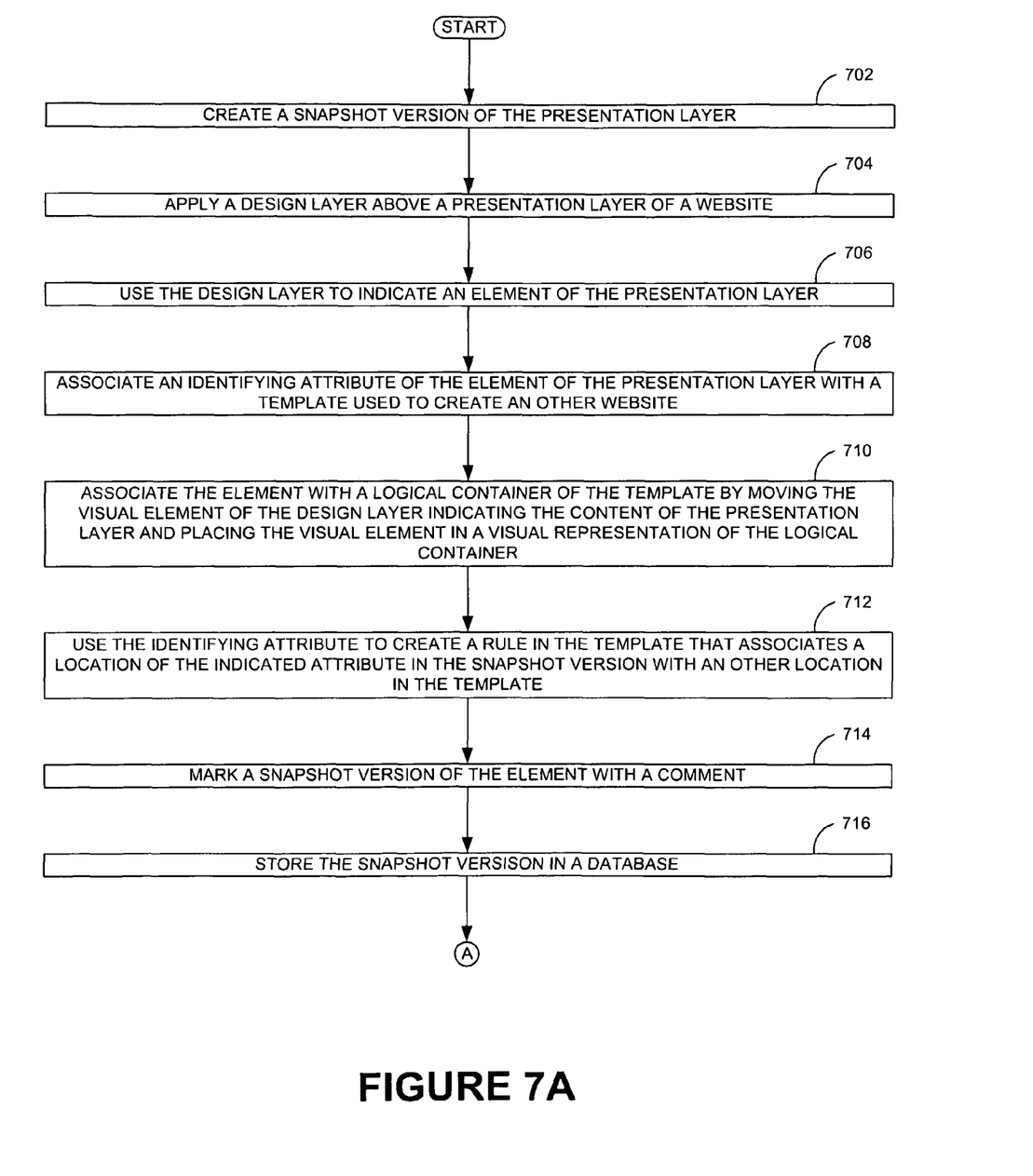
FIG. 7A is a process flow of applying a design layer above the presentation layer to adapt a website to a mobile device, according to one embodiment.

FIG. 7A is a process flow of applying a design layer above the presentation layer to adapt a website to a mobile device, according to one embodiment. In operation 702, a snapshot version of the presentation layer 204 may be created (e.g., using the snapshot module 122 of FIG. 1). In operation 704, a design layer (e.g., the design layer 208 of FIG. 2) may be applied (e.g., using the design layer module 114 of FIG. 1) above a presentation layer 204 of a website. In operation 706, the design layer 208 may be used (e.g., using the design layer module 114 of FIG. 1) to indicate an element of the presentation layer. In operation 708, an identifying attribute of the element of the presentation layer 206 may be associated (e.g., using the extraction module 116 of FIG. 1) with a template (e.g., the template 120 of FIG. 1) of another website (e.g., the other website 136 of FIG. 1). In operation 710, the element may be associated (e.g., using the container module) with a logical container 212 of the template 120 by moving the visual element of the design layer 208 indicating the content of the presentation layer 204 and placing the visual element in a visual representation of the logical container 212. In operation 712, the identifying attribute may be used (e.g., using the rule module 118) to create a rule in the template 120 that may associate a location of the indicated attribute in the snapshot version with another location in the template.

In operation 714, a snapshot version of the element may be marked (e.g., using the snapshot module 122 of FIG. 1) with a comment. In operation 716, the snapshot version may be stored (e.g., using the storage module 112 of FIG. 1) in a database.

Figure 7B:
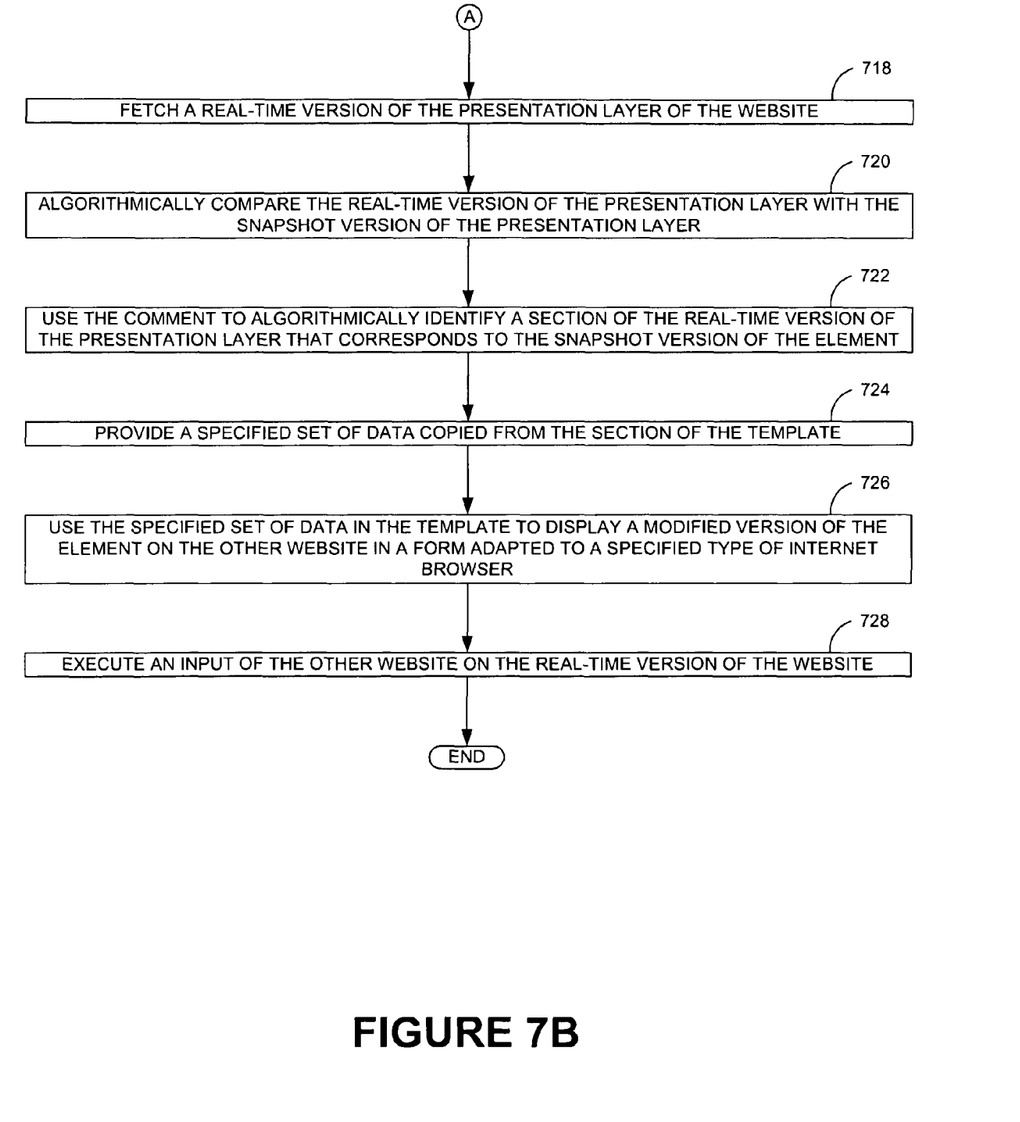
FIG. 7B is a continuation of process flow of FIG. 7A illustrating additional operations, according to one embodiment.

FIG. 7B is a continuation of process flow of FIG. 7A illustrating additional operations, according to one embodiment. In operation 718, a real-time version of the presentation layer of the website (e.g., using the of the presentation layer 204) may be fetched. In operation 720, the real-time version of the presentation layer 204 may be algorithmically compared with the snapshot version of the presentation layer 204. In operation 722, the comment may be used (e.g., using the smart merge module 132) algorithmically that may identify a section of the real-time version of the presentation layer 204 that may correspond to the snapshot version of the element. In operation 724, a specified set of data copied (e.g., using the data-supply module) from the section of the template 120 may be provided. In operation 726, the specified set of data in the template 120 may be used (e.g., using the presentation module 124) to display a modified version of the element on the other website 136 in a form adapted to a specified type of internet browser. In operation 728, an input of the other website 136 may be executed (e.g., using the simulation module 128) on the real-time version of the website.

Figure 8A:
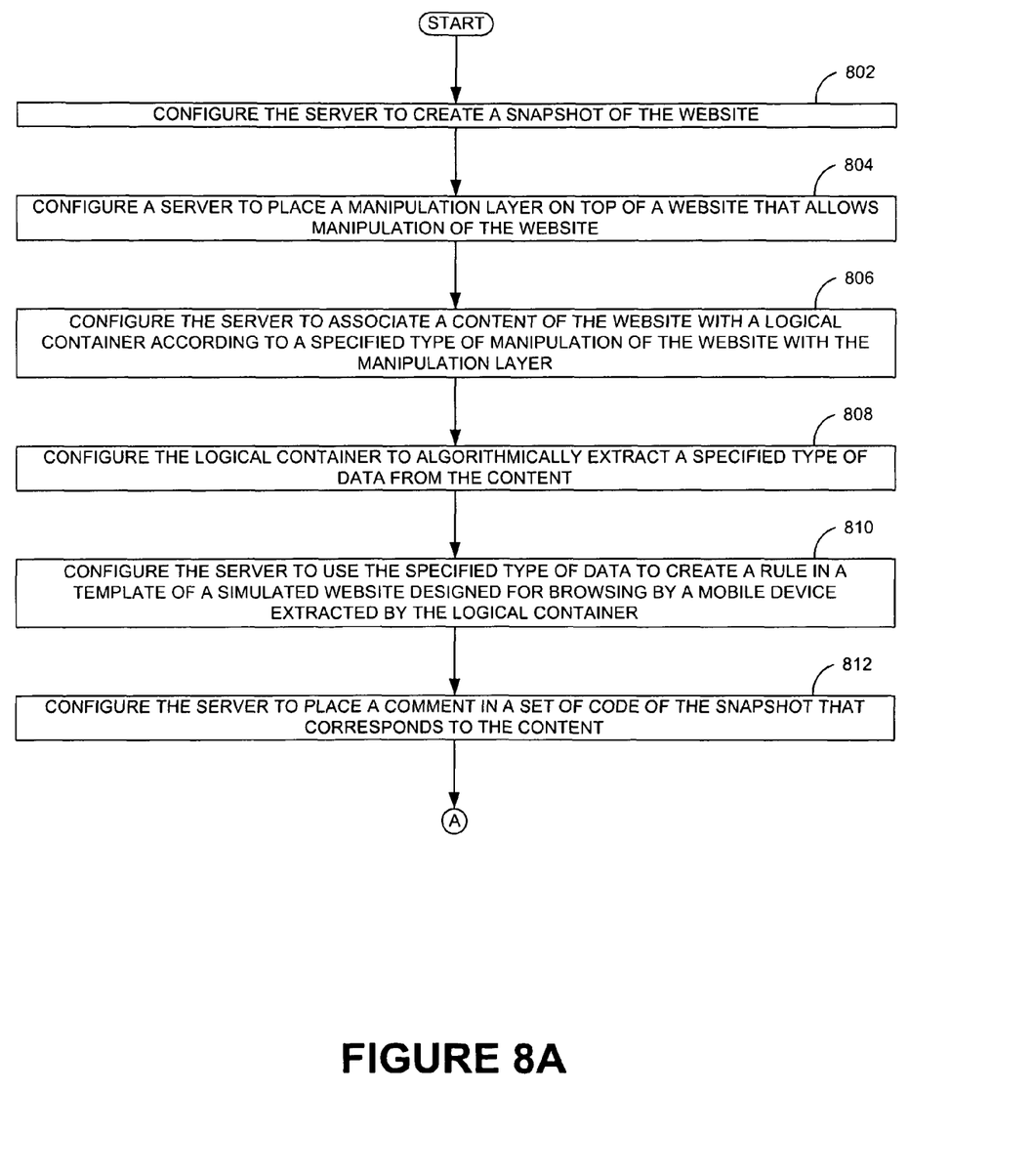
FIG. 8A is a process flow illustrating configuration of a server for manipulation of the website, according to one embodiment.

FIG. 8A is a process flow illustrating configuration of a server for manipulation of the website, according to one embodiment. In operation 802, the server may be configured (e.g., using the snapshot module 122 of FIG. 1) to create a snapshot of the website. In operation 804, a server may be configured to place a manipulation layer on top of a website (e.g., the website 104 of FIG. 1) that may allow manipulation of the website. In operation 806, the server may be configured (e.g., using the logical container module) to associate a content of the website 104 with a logical container (e.g., the logical container 212 of FIG. 2) according to a specified type of manipulation of the website 104 with the manipulation layer. In operation 808, the logical container 212 may be configured (e.g., using the smart merge module 132 of FIG. 1) that may algorithmically extract a specified type of data from the content. In operation 810, the server may be configured to use the specified type of data to create a rule in a template (e.g., the template 120 of FIG. 1) of a simulated website designed for browsing by a mobile device 406 extracted by the logical container 212. The rule may allow the server to associate the content with the template 120. In operation 812, the server may be configured (e.g., using the snapshot module 122 of FIG. 1) to place a comment in a set of code of the snapshot that corresponds to the content of the website.

Figure 8B:
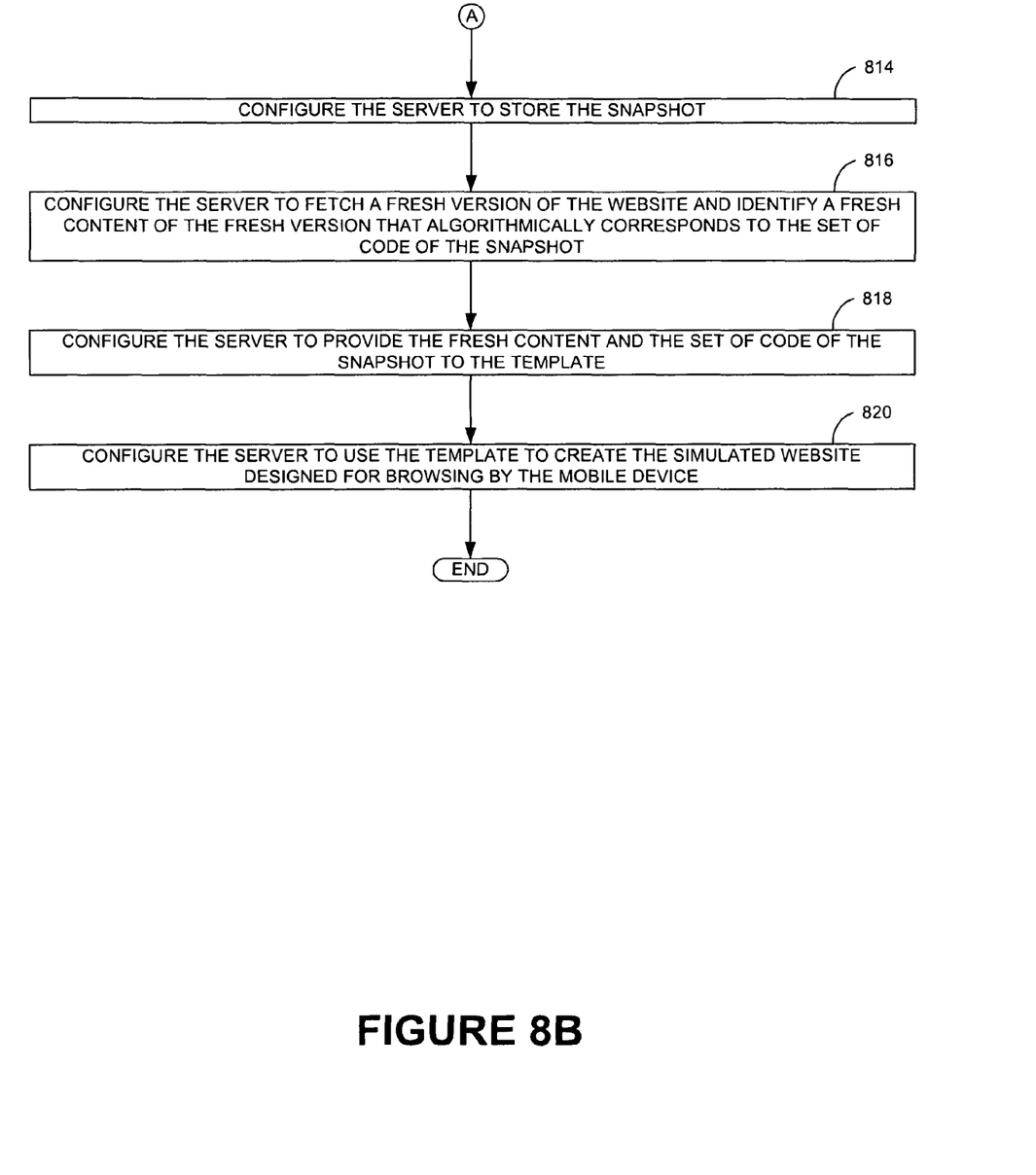
FIG. 8B is a continuation of process flow of FIG. 8A illustrating additional operations, according to one embodiment.

FIG. 8B is a continuation of process flow of FIG. 8A illustrating additional operations, according to one embodiment. In operation 814, the server may be configured (e.g., using the storage module 112 of FIG. 1) to store the snapshot. In operation 816, the server may be configured (e.g., using the real time module 134 of FIG. 1) to fetch a fresh version of the website 104 and identify a fresh content of the fresh version that algorithmically corresponds to the set of code of the snapshot. In operation 818, the server may be configured (e.g., using the real time module 134) to provide of the fresh content and the set of code of the snapshot to the template 120. In operation 820, the server may be configured (e.g., using the simulation module 128) to use the template 120 to create the simulated website designed for browsing by the mobile device 406.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/ or software (e.g., embodied in a machine readable medium). For example, the various electrical structures and methods may be embodied using transistors, logic gates, and electrical circuits (e.g., Application Specific Integrated (ASIC) Circuitry and/or in Digital Signal Processor (DSP) circuitry).

Particularly, the storage module 112, the design layer module 114, an extraction module 116, the rule module 118, the template module 120, the snapshot module 122, the presentation module 124, the simulation module 128, the data supply module 130, the smart merge module 132, the real time module 134 and/or the website module 202 of FIG. 1-8B may be enabled using software and/or using transistors, logic gates, and electrical circuits (e.g., application specific integrated ASIC circuitry) such as a storage circuit, a design layer circuit, an extraction circuit, a rule circuit, a template circuit, a snapshot circuit, a presentation circuit, a simulation circuit, a data supply circuit, a smart merge circuit, a real time circuit and/or a website circuit, and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

The invention claimed is:

1. A method comprising:
creating a snapshot version of the presentation layer of a website;
applying a design layer above the snapshot version;
indicating an element of the snapshot version using the design layer;
determining identifying attributes of the element that describe the presentation of the element;
associating the element with a template used to create an other website;
creating a rule that associates a location of the element in the snapshot version with a location in the template, and a rule for modifying presentation of the element in the snapshot to a presentation in the template based on the identifying attributes of the element;
designating modifications to the presentation of the element in the template according to manual modifications of the identifying attributes by a user; and
marking the element in the snapshot version with a comment describing the modifications to the identifying attributes of the element designated by the user.

2. The method of claim 1 further comprising: fetching a real-time version of the presentation layer of the website; algorithmically comparing the real-time version of the presentation layer with the snapshot version of the presentation layer; algorithmically identifying a section of the real-time version of the presentation layer that corresponds to the snapshot version of the element; and updating the template with a specified set of data copied from the section.

3. The method of claim 2 further comprising: adapting a modified version of the element on the other website to a specified type of internet browser by using the specified set of data in the template; and updating the specified set of data in the template based on a manual modifications designated of the user.

4. The method of claim 3 further comprising executing an input of the other website on the real-time version of the website.

5. The method of claim 4 wherein the identifying attribute is associated with the template by moving a visual element of the design layer indicating a content of the snapshot version of the presentation layer and placing the visual element in a visual representation of the template.

6. The method of claim 5 further comprising associating the element with a logical container of the template by moving the visual element of the design layer indicating the content and placing the visual element in a visual representation of the logical container; wherein the logical container extracts the identifying attribute from the element according to an extracting algorithm that is characteristic of the logical container; and wherein the design layer allows at least one of a mouse event and a document object model manipulation functionality to the presentation layer.

7. The method of claim 6 wherein a specified-type of logic container extracts a specified-type of identifying attribute of a specified-type of html element when the specified-type of html element of the snapshot version is placed in the specified-type of logic container.

8. The method of claim 7 wherein the other website is designed to be accessed by an internet browser of a mobile device.

9. A computer readable medium comprising a set of computer executable instructions adapted to perform the method of claim 1.

10. A system, including a processor and a memory, comprising:
a snapshot module to create a snapshot version of a presentation layer of a website;
a design layer module to apply a design layer above the snapshot version of the presentation layer of the website;
an extraction module to indicate an element of the snapshot version, to determine identifying attributes of the element that describe the presentation of the element, and to associate the element with a template used to create an other website; and
a rule module to create a rule in the template that associates a location of the element in the snapshot version with a location in the template and a rule for modifying presentation of the element in the snapshot to a presentation in the template based on the identifying attributes of the element; wherein the rule module designates modifications to the presentation of the element in the template according to manual modifications of the identifying attributes by a user;
a storage module to store the snapshot version in a database; and
wherein the snapshot module marks the element in the snapshot version with a comment describing the modification to the identifying attributes of the element designated by the user.

11. The system of claim 10 further comprising: a real-time module to fetch a real-time version of the website; a smart-merge module to compare the real-time version of the presentation layer with the snapshot version of the presentation layer and to use the comment to algorithmically identify a section of the real-time version that corresponds to the snapshot version of the element; and a data-supply module to provide a specified set of data copied from the section to the template.

12. The system of claim 11 further comprising a presentation module to use the specified set of data in the template to display a modified version of the element on the other website in a form for display on a specified type of internet browser.

13. The system of claim 12 further comprising a simulation module to execute an input of the other website on the real-time version of the website.

14. The system of claim 13: further comprising a container module to move the element into a logic container of the template; wherein the identifying attribute is associated with the template by moving a visual element of the design layer indicating a content of the snapshot version of the presentation layer and placing the visual element in a visual representation of the template; and wherein the logic container extracts the identifying attribute from the element according to an extracting algorithm according to a specified characteristic of the logic container.

15. The system of claim 14: wherein a specified-type of logic container extracts a specified-type of identifying attribute of a specified-type of html element when the specified-type of html element of the snapshot version is placed in the specified-type of logic container; wherein the extracting module associates an other data from a specified database other than the presentation layer with the template of an other website; and wherein the presentation module uses the other data in the template to display a modified version of the element on the other website in a form for display on a specified type of internet browser.

16. The method of claim 15: wherein the other website is designed to be accessed by an internet browser of a mobile device; and wherein the modified version of the element on the other website is in a form for display on a mobile device internet browser.

17. A method comprising:
configuring a server to place a manipulation layer on top of a website that allows manipulation of the website;
configuring the server to create a snapshot of the website;
configuring the server to associate a content of the website with a logical container according to a specified type of manipulation of the website with the manipulation layer;
configuring the server to determine identifying attributes of the content that describe the characteristics of the content;
configuring the logical container to algorithmically extract a specified type of data from the content; and configuring the server to use the specified type of data to create a rule in a template of a simulated website designed for browsing by a mobile device extracted and wherein the rule allows the server to associate the content with the template;
configuring the server to allow a user to designate modifications to presentation of the content in the template according to manual modifications of the identifying attributes of the content by a user;
configuring the server to place a comment in a set of code of the snapshot that corresponds to the content, and describes the modifications to the identifying attributes of the content designated by the user;
configuring the server to store the snapshot.

18. The method of claim 17 further comprising: configuring the server to fetch a fresh version of the website and identify a fresh content of the fresh version that algorithmically corresponds to the set of code of the snapshot; configuring the server to provide at least one of the fresh content and the set of code of the snapshot to the template; and configuring the server to use the template to create the simulated website designed for browsing by the mobile device.

* * * * *